United States Patent
Kamimura et al.

(10) Patent No.: US 9,325,009 B2
(45) Date of Patent: Apr. 26, 2016

(54) CATHODIC ACTIVE MATERIAL FOR NONAQUEOUS ELECTROLYTE SECONDARY BATTERY, CATHODE FOR NONAQUEOUS ELECTROLYTE SECONDARY BATTERY, AND NONAQUEOUS ELECTROLYTE SECONDARY BATTERY

(71) Applicant: SHARP KABUSHIKI KAISHA, Osaka-shi, Osaka (JP)

(72) Inventors: Yuichi Kamimura, Osaka (JP); Motoaki Nishijima, Osaka (JP); Tomohisa Yoshie, Osaka (JP); Koji Ohira, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 110 days.

(21) Appl. No.: 14/235,633

(22) PCT Filed: Jun. 5, 2013

(86) PCT No.: PCT/JP2013/065554
§ 371 (c)(1),
(2) Date: Jan. 28, 2014

(87) PCT Pub. No.: WO2013/183661
PCT Pub. Date: Dec. 12, 2013

(65) Prior Publication Data
US 2014/0186714 A1    Jul. 3, 2014

(30) Foreign Application Priority Data
Jun. 6, 2012  (JP) ................. 2012-128665

(51) Int. Cl.
*H01M 4/134* (2010.01)
*H01M 4/58* (2010.01)
*C01B 25/45* (2006.01)
*H01M 4/136* (2010.01)
*H01M 10/052* (2010.01)
*H01M 4/62* (2006.01)

(52) U.S. Cl.
CPC ............ *H01M 4/5825* (2013.01); *C01B 25/45* (2013.01); *H01M 4/136* (2013.01); *H01M 10/052* (2013.01); *H01M 4/623* (2013.01); *Y02E 60/122* (2013.01)

(58) Field of Classification Search
CPC ... H01M 4/134; H01M 4/131; H01M 4/5825; H01M 4/625; H01M 10/0525; H01M 10/052
See application file for complete search history.

(56) References Cited

U.S. PATENT DOCUMENTS

2009/0186277 A1    7/2009   Beck et al.
2012/0070708 A1*   3/2012   Ohira et al. ................. 429/94

FOREIGN PATENT DOCUMENTS

| CN | 101946346 A | 1/2011 |
|---|---|---|
| JP | 2002-198050 | 7/2002 |
| JP | 2005-519451 | 6/2005 |
| JP | 2008-506243 | 2/2008 |
| JP | 2012-022790 | 2/2012 |
| WO | WO 03/077335 | 9/2003 |
| WO | WO 2006/009355 | 1/2006 |

OTHER PUBLICATIONS

International Search Report for PCT/JP2013/065554, mailed Aug. 6, 2013.

* cited by examiner

*Primary Examiner* — Stewart Fraser
*Assistant Examiner* — Olatunji Godo
(74) *Attorney, Agent, or Firm* — Nixon & Vanderhye P.C.

(57) ABSTRACT

A cathodic active material for a nonaqueous electrolyte secondary battery according to the invention includes a lithium-containing transition metal phosphate containing Li and a transition metal. A transition metal site and P site of the lithium-containing transition metal phosphate are replaced by elements other than elements contained in the lithium-containing transition metal phosphate, and the quantity of P site is excessive with respect to a stoichiometric proportion of the lithium-containing transition metal phosphate. With this cathodic active material, a high-power and high-capacity secondary battery which is superior in safety and cost and has superior rate performance can be provided.

7 Claims, No Drawings

CATHODIC ACTIVE MATERIAL FOR NONAQUEOUS ELECTROLYTE SECONDARY BATTERY, CATHODE FOR NONAQUEOUS ELECTROLYTE SECONDARY BATTERY, AND NONAQUEOUS ELECTROLYTE SECONDARY BATTERY

This application is the U.S. national phase of International Application No. PCT/JP2013/065554, filed 5 Jun. 2013, which designated the U.S. and claims priority to JP Application No. 2012-128665, filed 6 Jun. 2012; the entire contents of each of which are hereby incorporated by reference.

TECHNICAL FIELD

The present invention relates to a cathodic active material for a nonaqueous electrolyte secondary battery, a cathode for a nonaqueous electrolyte secondary battery, and a nonaqueous electrolyte secondary battery.

BACKGROUND ART

Lithium secondary batteries have been in practical and widespread use as secondary batteries for portable electronic devices. Furthermore, in recent years, lithium secondary batteries have drawn attention not only as small-sized secondary batteries for portable electronic devices but also as high-power and high-capacity devices for use in vehicles, power storage, and the like. Therefore, there has been a growing demand for the lithium secondary batteries with higher safety standards, lower costs, longer lives, and the like.

A lithium secondary battery is composed mainly of a cathode, an anode, an electrolyte, a separator, and an armoring material. Further, the cathode is constituted by a cathodic active material, a conductive material, a current collector, and a binder (binding agent).

In general, the cathodic active material is realized by a layered transition metal oxide such as $LiCoO_2$. However, in a state of full charge, such layered transition metal oxides are prone to cause oxygen desorption at a comparatively low temperature of approximately 150° C., and such oxygen desorption may cause a thermal runaway reaction in the battery. Therefore, when a battery having such a cathodic active material is used for a portable electronic device, there is a risk of an accident such as heating, igniting, and the like of the battery.

For this reason, in terms of safety, expectations have been placed on lithium manganate ($LiMn_2O_4$) having a spinel-type structure, lithium iron phosphate ($LiFePO_4$) having an olivine-type structure, and the like that are stable in structure and do not emit oxygen in abnormal times.

Further, in terms of cost, cobalt (Co) is low in degree of existence in the earth's crust and high in price. For this reason, expectations have been placed on lithium nickel oxide ($LiNiO_2$) or a solid solution thereof ($Li(Co_{1-x}Ni_x)O_2$), lithium manganate ($LiMn_2O_4$), lithium iron phosphate ($LiFePO_4$), and the like.

Therefore, for example, such lithium iron phosphate having an olivine-type structure has drawn attention as a cathodic active material for a battery considering the safety, cost, and battery life. However, when the lithium iron phosphate having an olivine-type structure is used as a cathodic active material for a battery, there is a problem in that rate performance is low. That is, there is a problem in that, along with an increase in load discharge (current discharge), the discharge capacity and the discharge voltage greatly deteriorate due to an increase in the internal resistance of a battery.

In order to solve this problem, PTL 1 discloses a method of replacing P site of a cathodic active material with element A to increase the conductivity of the cathodic active material and improve the discharge capacity, in which the cathodic active material is represented by Formula $LiMP_{1-x}A_xO_4$ (wherein M is a transition metal, A is an element having an oxidation number of +4 or less, and $0<x<1$).

In addition, PTL 2 discloses a method of using a material represented by Formula $Li_{1-x}A_xFe_{1-Y-Z}M_yMe_zP_{1-m}O_{4-n}Z_n$ (wherein A is at least one of Na and K; M is at least one of metal elements other than Fe, Li, and Al; Me is at least one of Li and Al; X is at least one of Si, N, As, and S; Z is at least one of F, Cl, Br, I, S, and N; $0≤x≤0.1$; $0≤y≤0.5$; $0≤z≤0.3$; $0≤y+z≤0.5$; $0≤m≤0.3$; $0≤n≤0.5$; and $x+z+m+n>0$) as a cathodic active material to improve large-current charge-discharge behavior.

In addition, PTL 3 discloses a method of using a material represented by Formula $A_{a+x}M_bP_{1-x}Si_xO_4$ (wherein A is selected from the group consisting of Li, Na, K, and mixtures thereof, where $0<a<1$ and $0≤x≤1$; and M comprises one or more metals, comprising at least one metal which is capable of oxidation to a higher valence state, where $0<b≤2$) as a cathodic active material to increase capacity, cycling performance, and reversibility and to reduce cost.

CITATION LIST

Patent Literature

PTL 1: Japanese Unexamined Patent Application Publication No. 2008-506243
PTL 2: Japanese Unexamined Patent Application Publication No. 2002-198050
PTL 3: Japanese Unexamined Patent Application Publication (Translation of PCT Application) No. 2005-519451

SUMMARY OF INVENTION

Technical Problem

The above-described cathodic active materials disclosed in PTLs 1 to 3 are obtained by replacing P site or both M site and P site in Formula $LiMPO_4$ by other elements. Regarding the effects thereof, for example, in PTL 2, the reason for insufficient large-current charge-discharge behavior is presumed to be that the diffusion of Li in the cathodic active material during charging and discharging is inhibited by a crystal skeleton, and in order to produce strains in the crystal skeleton, the replacement by other elements is performed.

However, according to the findings of the present inventors, when P site or both M site and P site in $LiMPO_4$ are replaced by other elements, Li site is occupied by M or a replacing element on M site. As a result, a diffusion path of Li is blocked, Li cannot be desorbed, the capacity is reduced, and rate performance is difficult to improve.

The invention has been made in consideration of the above-described problems, and an object thereof is to provide a cathodic active material for a nonaqueous electrolyte secondary battery capable of providing a high-power and high-capacity secondary battery which is superior in safety and cost and has superior rate performance; a cathode for a nonaqueous electrolyte secondary battery; and a nonaqueous electrolyte secondary battery.

Solution to Problem

In order to solve the above-described problems, according to the invention, there is provided a cathodic active material for a nonaqueous electrolyte secondary battery including a lithium-containing transition metal phosphate whose transition metal site and P site are replaced, in which the quantity of P site is excessive with respect to the stoichiometric proportion of the P site to the transition metal site.

In addition, according to the invention, there is provided a cathode for a nonaqueous electrolyte secondary battery including: a cathodic active material; a conductive material; and a binder. The cathodic active material includes a lithium-containing transition metal phosphate whose transition metal site and P site are replaced, in which the quantity of P site is excessive with respect to the stoichiometric proportion of the P site to the transition metal site.

In addition, according to the invention, there is provided a nonaqueous electrolyte secondary battery including: a cathode that includes the cathodic active material, a conductive material, and a binder; an anode; an electrolyte; and a separator. The cathodic active material includes a lithium-containing transition metal phosphate whose transition metal site and P site are replaced, in which the quantity of P site is excessive with respect to the stoichiometric proportion of the P site to the transition metal site.

In the invention, Li site, the transition metal site, and P site represent equivalent positions which are crystallographically occupied by Li, the transition metal, and P in the lithium-containing transition metal phosphate. The atomic arrangement of a crystalline material can be geometrically classified. The atomic arrangements of all the crystalline materials can be classified into 230 space groups. In these space groups, atoms being present in a crystal structure are defined as atoms being present in an equivalent position, that is, being present in a crystallographically equivalent environment in consideration of symmetry, repeatability, and the like. For example, specifically, it is known that $LiFePO_4$ belongs to space group Pnma, and Li, Fe, and P are positioned in site 4a, site 4c, and site 4c, respectively. The definition of the space groups and the equivalent position refers to "INTERNATIONAL TABLE FOR CRYSTALLOGRAPHY Volume A" (published by International Union of Crystallography).

Advantageous Effects of Invention

According to the invention, it is possible to provide a high-power and high-capacity nonaqueous electrolyte secondary battery which is superior in safety and cost and has superior rate performance.

DESCRIPTION OF EMBODIMENTS

Hereinafter, embodiments of the invention will be described.

A cathodic active material for a nonaqueous electrolyte secondary battery according to the invention includes a lithium-containing transition metal phosphate whose transition metal site and P site are replaced, in which the quantity of P site is excessive with respect to the stoichiometric proportion of the P site to the transition metal site.

In the cathodic active material according to the invention, the quantity of P site is excessive with respect to the stoichiometric proportion of the P site to the transition metal site. For example, the lithium-containing transition metal phosphate is represented by Formula $Li_\alpha M_\beta P_{(\gamma+\epsilon)}O_\delta$, where M represents a transition metal; and when $\alpha$, $\beta$, $\gamma$, and $\delta$ are numerical values satisfying the stoichiometric proportions, $\epsilon$ is a numerical value indicating the excess quantity of P site with respect to the stoichiometric proportions of P site and M site, and preferably, $\epsilon$ satisfies a relationship of $0<(\epsilon/\gamma)\leq 1$.

In the invention, the transition metal constituting the transition metal site is Fe, Mn, Co, or Ni, and in consideration of a potential window of an electrolyte in the existing liquid system, and is preferably Fe or Mn and more preferably Mn. Since Mn has a high redox potential of approximately 4 V, this redox potential is close to an oxidative decomposition potential of an electrolyte. Since Mn has significantly low electronic conductivity and ion conductivity, the resistance thereof is high and the oxidative decomposition of an electrolyte is likely to occur. Therefore, since the resistance is reduced by the cathodic active material according to the invention, the improvement effect is high.

In addition, the transition metal site is replaced by at least one metal element selected from Zr, Sn, Y, and Al and preferably replaced by Zr. P site is preferably replaced by Si.

According to the invention, by controlling the quantity of P site to be excessive with respect to the stoichiometric proportions of P site and the transition metal site, the quantity of the transition metal occupying Li site can be reduced. As a result, the blockage of the diffusion path of Li is suppressed, Li is easily desorbed, and the diffusion rate of Li can be improved. Particularly in the case of an olivine-type lithium iron phosphate which is included in the cathodic active material according to the invention, the diffusion path of Li is directed to only the b axis direction, and the diffusion of Li is single diffusion. Therefore, as compared to $LiCoO_2$ (double diffusion) and $LiMn_2O_4$ (triple diffusion) which are other well-known cathodic active materials, an effect of improving the diffusion rate is high. In addition, since the quantity of the transition metal occupying Li site can be reduced, Li which has been electrochemically inactive (which has not been capable of contributing to insertion and desorption) becomes electrochemically active, thereby obtaining an effect of increasing the charging and discharging capacity. In addition, since the quantity of the transition metal occupying Li site can be reduced, the insertion and desorption of Li on Li site are easy. As a result, structural destruction caused by Li diffusion during charging and discharging is suppressed, and thus the exfoliation of the cathodic active material from a current collector or a conductive material can be suppressed. Therefore, an effect of improving cycling characteristics is also obtained.

A cathodic active material according to a preferable embodiment of the invention includes P site replaced by Si and can be represented by the following formula (1).

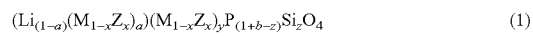

$(Li_{(1-a)}(M_{1-x}Z_x)_a)(M_{1-x}Z_x)_y P_{(1+b-z)}Si_z O_4$ (1)

In the formula (1), M is Fe or Mn; Z is at least one metal element selected from Zr, Sn, Y, and Al; $0.01\leq x\leq 0.33$; $0.9\leq y\leq 1.0$; $0.02\leq z\leq 0.66$; $0<a\leq 0.1$; and $0<b\leq 0.1$. Here, a (occupancy of $(M_{1-x}Z_x)$ on Li site), y (occupancy of $(M_{1-x}Z_x)$ on M site), and $(1+b)$ (quantity of P site) are values which are obtained by Rietveld analysis from a powder X-ray diffraction pattern in which $CuK\alpha$ rays are used as a radiation source. x (substitution amount of Z) and z (occupancy of Si on P site) are values which are quantitatively calculated by ICP-Mass Spectrometry (ICP-MS). In the formula (1), x satisfies, when Z is Zr, Sn, or Y, preferably $0.01\leq x\leq 0.25$, more preferably $0.01\leq x\leq 0.125$, and still more preferably $0.01\leq x\leq 0.1$. When x is increased, 1−x (occupancy of the transition metal on the transition metal site) is relatively decreased. However, compensation for electron charges during charging and discharging is made by a change in valence of the transition metal. Therefore, when x is excessively increased, the capacity is excessively decreased, which is not preferable. Therefore, the upper limit of x is set as 0.25. When Z is Al, x satisfies preferably $0.01\leq x\leq 0.33$, more preferably $0.01\leq x\leq 0.125$, and still more preferably 0.01≤x≤0.1. Similar to the cases where Z is Zr, Sn, or Y, the upper limit of x is set as 0.33 from the viewpoint of capacity.

A cathodic active material according to a more preferable embodiment of the invention includes a transition metal site replaced by Zr and can be represented by the following formula (2).

$$(Li_{(1-a)}(M_{1-x}Zr_x)_y P_{(1+b-z)}Si_zO_4) \quad (2)$$

In the formula (2), M is Fe or Mn, 0.01≤x≤0.1, 0.9≤y≤1, 0.02≤z≤0.2, 0<a≤0.1, and 0<b≤0.2. Here, a (occupancy of $(M_{1-x}Z_x)$ on Li site), y (occupancy of $(M_{1-x}Z_x)$ on M site), and (1+b+z) (quantity of P site) are values which are obtained by Rietveld analysis from a powder X-ray diffraction pattern in which CuKα rays are used as a radiation source. x (substitution amount of Z) and z (occupancy of Si on P site) are values which are quantitatively calculated by ICP-Mass Spectrometry (ICP-MS).

In the formula (2), a satisfies 0<a≤0.1. In order to further improve the diffusion rate of Li, a satisfies preferably 0<a≤0.05, more preferably 0<a≤0.04, and still more preferably 0<a≤0.025. When a is greater than 0.1, the diffusion rate of Li is decreased, which is not preferable.

When a is in the above-described range, an effect of improving cycling characteristics is also obtained. For example, in the case of an olivine-type lithium iron phosphate, the diffusion path of Li is directed to only the b axis direction, and the diffusion of Li is single diffusion. Therefore, when $(M_{1-x}Zr_x)$ is present on the diffusion path of Li during charging and discharging, if Li is forcedly diffused beyond $(M_{1-x}Zr_x)$, there is a problem in that a structure is partially destructed. As a result, primary particles are destructed, the physical deficiency of the cathodic active material from a current collector or a conductive material occurs, and the capacity deteriorates along with an increase in the number of cycles. However, when a is in the above-described range, the diffusion path of Li is prevented from being blocked by $(M_{1-x}Zr_x)$. Therefore, deterioration in cycling characteristics which occurs along with structural destruction can be suppressed.

In addition, in the formula (2), b satisfies 0<b≤0.2, preferably 0.03≤b≤0.2, more preferably 0.04≤b≤0.2, and still more preferably 0.05≤b≤0.2. When b is increased, a is decreased. Therefore, the more the value of b, the better.

In addition, in the formula (2), x satisfies 0.01≤x≤0.1, preferably 0.01<≤x≤0.08, and more preferably 0.01≤x≤0.05. When x is increased, 1−x (occupancy of the transition metal on the transition metal site) is relatively decreased. However, compensation for electron charges during charging and discharging is made by a change in valence of the transition metal. Therefore, when x is excessively increased, the capacity is excessively decreased, which is not preferable.

In addition, in the formula (2), y satisfies 0.9≤y≤1 and preferably 0.9≤y≤0.95. The reason is that, when y is less than 0.9, the capacity is decreased, the shape of a crystal lattice is difficult to maintain, and impurities are produced.

According to the findings of the invention, when atoms are deficient on the transition metal site, the diffusion in the a axis direction can be performed, the capacity can be secured even when primary particles are greater than or equal to 100 nm. "Being deficient" described herein represents that, in an equivalent position in which elements should be normally fully present, a part of elements are deficient and vacancies having no atoms are formed.

In addition, in the formula (2) z satisfies 0.02≤z≤0.2 and preferably 0.02≤z≤0.1. When z satisfies 0.02≤z≤0.1, cycling characteristics are improved, and an effect of promoting synthesis can be obtained. When z is greater than 0.2, impurities are likely to be produced, which is not preferable. Si has an effect of suppressing the volume expansion and shrinkage ratios of the cathodic active material. Generally in the case of an olivine-type lithium iron phosphate, the volume is shrunk when Li is desorbed from the initial structure during charging. In this structural change, the a and b axes are shrunk, and the c axis is expanded. Therefore, the volume change can be suppressed by reducing the shrinkage ratios of the a and b axes and increasing the expansion ratio of the c axis. By replacing P site by Si, the above-described effect can be obtained. As a result, the volume expansion and shrinkage ratios of the cathodic active material can be suppressed during charging and discharging. Accordingly, cycling characteristics are improved.

In addition, the transition metal of the transition metal site in the formula (2) is usually an element capable of taking on a valence of +2 or +3. It is preferable that the average valence of the transition metal be +2, and it is more preferable that the valences of all the transition metals be +2. Since Li ions are desorbed from the cathodic active material during charging, the transition metal of the transition metal site is oxidized to maintain electrochemical neutrality. That is, when the valence of the transition metal before charging is low, the quantity of the transition metal contributing to charging and discharging is increased. As a result, the capacity of the battery can be increased.

In addition, in the formula (2), it is preferable that (1−a)≥y×(1−x). The left side corresponds to the quantity of Li, and the right side corresponds to the quantity of the transition metal. Compensation for electron charges during charging and discharging is made by a change in valence of the transition metal. Therefore, if the quantity of Li the quantity of the transition metal, all the changes in valence of the metal elements of the transition metal site can be used. As a result, the capacity of the battery can be increased.

Most of the lithium-containing transition metal phosphates having the composition represented by the formula (2) has an olivine-type structure, but the cathodic active material according to the invention is not limited to a compound having an olivine-type structure. Compounds having no olivine-type structures are also included in the scope of the invention as long as they are lithium-containing transition metal phosphate having the compositions represented by the formulae (1) and (2).

(Method of Preparing Cathodic Active Material)

The cathodic active material according to the above-described embodiment can be prepared by using, as a starting material, an arbitrary combination of carbonates, hydroxides, chlorides, sulfates, acetates, oxides, oxalates, nitrates, and the like of the respective elements. Among these, from the viewpoint of suppressing the production of a gas affecting synthesis during sintering, carbonates, hydroxides, acetates, oxides, and oxalates are preferable. Among these, carbonates, hydroxides, acetates, and oxalates which can be decomposed at a low temperature (that is, synthesized at a low temperature) are more preferable. Due to the composition in which an olivine-type structure represented by the formula $LiMPO_4$ is doped with other elements, when a gas adversely affecting synthesis during sintering is produced, single-phase synthesis is difficult to perform. In addition, when the sintering temperature is increased, replaced other elements may be desorbed from the olivine-type structure and are reformed as impurities. For these reasons, the above-described starting material is preferable.

In addition, from the viewpoint of easily preparing a uniform solution in the atmosphere using a liquid-phase method at a low cost, weak acid salts (carbonates, acetates, and oxalates) or strong acid salts (nitrates and chlorides) are preferable. Among these, acetates and nitrates are more preferable.

Usable examples of a method of preparing the above-described cathodic active material include a solid-phase method, a sol-gel method, a melt extraction method, a mechanochemical method, a coprecipitation method, a hydrothermal method, and an atomized pyrolysis method. In the formula (2), due to the composition in which an olivine-type structure represented by the formula $LiMPO_4$ is doped with other elements, a uniform mixed state before sintering and a small particle size are important factors for single-phase synthesis. From these points of view, among the above-described methods, a sol-gel method, a coprecipitation method, a hydrothermal method, and an atomized pyrolysis method which are liquid-phase methods are preferable. From the viewpoint of yield, a sol-gel method, a coprecipitation method, and a hydrothermal method are more preferable. A sol-gel method is still more preferable. Oxides prepared using a sol-gel method have a small deviation from the stoichiometric proportion. Therefore, according to the invention, the effect obtained by controlling the quantity of P site to be excessive can be used to the maximum.

In addition, as is commonly performed in an olivine-type lithium iron phosphate, a carbon film may be formed on the cathodic active material. This carbon film has a favorable effect on synthesis and electrochemical characteristics. In regard to synthesis, since M in the formula (2) is preferably divalent, for example, carbon can make sintering be performed in a reducing atmosphere and can suppress particle aggregation. In regard to electrochemical characteristics, the conductivity can be improved. In particular, since P in the formula (2) is replaced by Si, it is expected that electronic conductivity is decreased. Therefore, the formation of the carbon film is important.

(Nonaqueous Electrolyte Secondary Battery)

A nonaqueous electrolyte secondary battery according to an embodiment of the invention includes a cathode, an anode, an electrolyte, and a separator. Hereinafter, each constituent material will be described.

(a) Cathode

The cathode, composed of such a cathodic active material according to the embodiment, a conductive material, and a binder (binding agent), can be made, for example, by a method such as application to a current collector of a slurry obtained by mixing the cathodic active material, the conductive material, and the binder with an organic solvent.

Usable examples of the binder (binding agent) include polytetrafluoroethylene, polyvinylidene fluoride, polyvinylchloride, ethylene-propylene diene polymer, styrene-butadiene rubber, acrylonitrile-butadiene rubber, fluorocarbon rubber, polyvinyl acetate, polymethyl methacrylate, polyethylene, and nitrocellulose.

Usable examples of the conductive material include acetylene black, carbon, graphite, natural graphite, artificial graphite, and needle coke.

Usable examples of the current collector include a foam (porous) metal having continuous holes, a metal shaped in a honeycomb pattern, a sintered metal, an expanded metal, nonwoven cloth, a plate, foil, a perforated plate, perforated foil, and a metal foil coated with carbon. Among these, a metal foil coated with carbon is preferably used. In the cathodic active material represented by the formula (2), since P is replaced by Si, a particle size distribution thereof is wider than that of an olivine-type structure of $LiMPO_4$. Therefore, the contact area between the current collector and the cathodic active material is small, and the adhesion strength of the cathodic active material with the current collector is weak. In the metal foil coated with carbon, there are rougher convex and concave portions than a metal foil. Therefore, the contact surface between the metal foil and the cathodic active material is increased, and the adhesion strength is increased. As a result, the peeling of the cathodic active material from the current collector is suppressed, and the battery life is improved. Accordingly, it is preferable that the metal foil coated with carbon be used particularly in the cathodic active material represented by the formula (2).

Usable examples of the organic solvent include N-methylpyrrolidone, toluene, cyclohexane, dimethylformamide, dimethylacetoamide, methyl ethyl ketone, methyl acetate, methyl acrylate, diethyltriamine, N—N-dimethylaminopropylamine, ethylene oxide, and tetrahydrofuran.

It is preferable that the cathode have a thickness of approximately 0.01 mm to 20 mm. Too great a thickness undesirably causes a decrease in electrical conductivity, and too small a thickness undesirably causes a decrease in capacity par unit area. It should be noted that the cathode, obtained by application and drying, may be consolidated by a roller press or the like so that the cathodic active material has a higher filling density.

(b) Anode

The anode can be made by the same method as described in the method for making the cathode, that is, by mixing the binding agent and the conductive material with an anodic active material, molding the mixed powder into a sheet, and then pressure-bonding the molded product to a net (current collector) made of a conducting material such as stainless steel or copper. Alternatively, the anode can also be made by applying, onto a substrate made of metal such as copper, a slurry obtained by mixing the mixed powder with the above-described organic solvent.

In order to constitute a high-energy density battery, in the anodic active material, it is preferable that the potential of insertion/desorption of Li be close to the deposition/dissolution potential of metal lithium. Typical examples of such an anodic active material include carbon materials such as natural or artificial graphite in the form of particles (for example, scales, clumps, fibers, whisker, spheres, and crushed particles).

Examples of the artificial graphite include graphite obtainable by graphitizing mesocarbon microbeads, mesophase pitch powder, isotropic pitch powder, and the like. Alternatively, it is possible to use graphite particles having amorphous carbon adhering to their surfaces. Among these, natural graphite is more preferable because it is inexpensive, is close in oxidation-reduction potential to Li, and can constitute a high-energy density battery.

Alternatively, it is possible to use a lithium transition metal oxide, a lithium transition metal nitride, a transition metal oxide, an oxide silicon, or the like as the anodic active material. Among these, $Li_4Ti_5O_{12}$ is more preferable because it is high in potential flatness and small in volume change due to charging and discharging.

(c) Electrolyte

Usable examples of the electrolyte include an organic electrolyte, a gel electrolyte, a polymer solid electrolyte, an inorganic solid electrolyte, and a molten salt. After injection of the electrolyte, an opening in the battery is sealed. It is possible to remove gas generated when the electricity is turned on before the sealing.

Examples of an organic solvent that constitutes the organic electrolyte include: cyclic carbonates such as propylene carbonate (PC), ethylene carbonate (EC), and butylene carbonate; chain carbonates such as dimethyl carbonate (DMC), diethyl carbonate (DEC), ethyl methyl carbonate, and dipropyl carbonate; lactones such as γ-butyrolactone (GBL) and γ-valerolactone; furans such as tetrahydrofuran and 2-methyl tetrahydrofuran; ethers such as diethyl ether, 1,2-dimethoxy ethane, 1,2-diethoxy ethane, ethoxy methoxy ethane, and dioxane; dimethyl sulfoxide; sulforan; methyl sulforan; acetonitrile; methyl formate; and methyl acetate. These organic solvents can be used alone or in combination of two or more of them.

Further, the cyclic carbonates such as PC, EC, and butylene carbonate are high boiling point solvents and, as such, are suitable as a solvent to be mixed with GBL.

Examples of an electrolyte salt that constitutes the organic electrolyte include lithium salts such as fluoroboric lithium ($LiBF_4$), lithium hexafluorophosphate ($LiPF_6$), trifluoromethanesulfonic lithium ($LiCF_3SO_3$), trifluoroacetic lithium ($LiCF_3COO$), and lithium bis(trifluoromethanesulfone)imide ($LiN(CF_3SO_2)_2$). These electrolyte salts can be used alone or in combination of two or more of them. A suitable salt concentration of the electrolyte is 0.5 mol/l to 3 mol/l.

(d) Separator

Examples of the separator include a porous material and nonwoven cloth. It is preferable that the separator be made of such a material as mentioned above that neither dissolves nor swells in response to the organic solvent contained in the electrolyte. Specific examples are polyester polymers, polyolefin polymers (for example, polyethylene and polypropylene), ether polymers, and inorganic materials such glass.

The components, such as the separator, a battery case, and other structural materials, of a secondary battery according to an embodiment of the invention may be, but are not particularly limited to, various materials that are used in a nonaqueous electrolyte secondary battery.

(e) Method for Producing Nonaqueous Electrolyte Secondary Battery

The nonaqueous electrolyte secondary battery according to the embodiment can be made, for example, by layering the cathode and the anode in such a way that the separator is sandwiched between them. The layered electrode may have a rectangular planar shape.

Such a single-layered electrode or a plurality of such layered electrodes is/are inserted into a battery container. Usually, the cathode(s) and the anode(s) are each connected to an external conductive terminal of the battery. After that, the battery container is sealed so that the electrode(s) and the separator(s) are shielded from outside air.

Regarding a sealing method, in the case of a cylindrical battery, the battery container is usually sealed by fitting a resin gasket in the opening of the battery container and then caulking the battery container. In the case of a cuboidal battery, the battery container can be sealed by mounting a metal lid (called a metal sealing plate) on the opening and then joining them by welding. Other than these methods, the battery container can be sealed by a binding agent or by fastening it with a bolt through a gasket. Furthermore, the battery container can be sealed by a laminate film obtained by joining a thermoplastic resin on top of metal foil. When sealed, the battery container may be provided with an opening through which the electrolyte is injected. The manufacturing processes of the nonaqueous electrolyte secondary battery include an impregnation process of the electrolyte in a vacuum. Through the impregnation process of the electrolyte in a vacuum, the permeation of the electrolyte to the cathode, the anode, and the separator are improved, the diffusion of Li ions is improved, and the capacity, rate performance, and cycling characteristics are improved.

The invention is not limited to the above-described embodiments, and various modifications can be made within the scope of the Claims. That is, an embodiment based on a proper combination of technical means disclosed in different embodiments within the scope of the Claims is encompassed in the technical scope of the present invention.

EXAMPLES

Hereinafter, the invention will be described in more detail using examples but is not limited to these examples.

Example 1

Preparation of Cathodic Active Material

As starting materials, a lithium source $LiCH_3COO$, an iron source $FeC_2O_4.2H_2O$, a zirconium source $ZrO(CH_3COO)_2$, an aluminum source $Al(NO_3)_3.9H_2O$, a tin source $Sn(CH_3COO)_2$, a phosphorus source $(NH_4)_2HPO_4$, and a silicon source $SiO_2$ were used. These starting materials were measured out so that the molar ratio satisfies Li:Fe:Zr:P:Si=1: 0.96:0.04:1.02:0.04, with the lithium source $LiCH_3COO$ used in an quantity of 0.6599 g. These starting materials were mixed well in an agate mortar. The obtained mixture was crushed and mixed using a planetary type ball mill. As ball mill conditions, a rotating speed was 400 rpm, a rotating time was 1 hour, a zirconia ball having a diameter of 10 mm was used as a ball, and a zirconia ball pot was used as a mill pot.

15% by weight of sucrose with respect to the obtained powder was dissolved in an aqueous solution. The obtained powder was mixed with the solution, followed by mixing in a agate mortar and drying at 60° C. The obtained powder was put into a quartz crucible, followed by sintering in a nitrogen atmosphere under conditions of a sintering temperature of 550° C., a sintering time of 12 hours, and a temperature increase/decrease rate of 200° C./h. As a result, $Li_{0.979}(FeZr)_{0.021}(FeZr)_{0.997}P_{1.02}Si_{0.04}O_4$ single-phase powder was synthesized. It should be noted that a composition ratio of the obtained powder was a value obtained from Rietveld analysis described below and a composition quantity unless specified otherwise.

(Structure Analysis)

The obtained cathodic active material was crushed in an agate mortar, and a powder X-ray diffraction pattern was obtained using an X-ray diffraction analyzer (trade name MinFlexII; manufactured by Rigaku Co., Ltd.). Next, the obtained powder X-ray diffraction pattern was analyzed using "RIETAN-2000" (F. Izumi and T. Ikeda, Mater. Sci. Forum, 321-324 (2000) 198-203). The structure was refined under conditions where the occupancies of Fe and of Li on site 4a satisfy the following expression. In regard to other examples, the kind and quantity of a replacing element were appropriately changed and subjected to structure analysis.

Occupancy of Fe on Site 4a+Occupancy of Li on Site 4a=1

The structure was refined by setting y as a variable parameter and fixing the other occupancies to the initial values of the following Table 1.

Measurement conditions of the powder X-ray diffraction pattern are set as follows: a voltage of 30 kV, a current of 15 mA, a divergence slit of 1.25°, a receiving slit of 0.3 mm, a scattering slit of 1.25°, a 2θ range of 10° to 90°, and a single step of 0.02°. A measurement time per step was adjusted such that a maximum peak intensity was 800 to 1500. By using "RIETAN-2000" described above or "RIETAN-FP" (F. Izumi and K. Momma, "Three-dimensional visualization in powder diffraction," Solid State Phenom., 130, 15-20 (2007))

as an analysis software, an ins file was created with parameters shown in Table 1 as the initial values. Using DD3.bat, structure analysis was performed by Rietveld analysis. Through 0.1st file, various parameter were read to determine lattice constants.

The structure was refined by setting 1+b as a variable parameter and fixing the other occupancies to the initial values of the following Table 1.

TABLE 1

| Space Group | Pnma | Orientation Direction | (100) | | |
|---|---|---|---|---|---|
| Lattice Parameter | a 10.3270 | b 6.0060 | c 4.6966 | | |
| Element | Site | Occupancy | x | y | z |
| Li | 4a | 1 | 0 | 0 | 0 |
| Fe | 4a | 0 | 0 | 0 | 0 |
| Zr | 4a | 0 | 0 | 0 | 0 |
| Fe | 4c | Distributed | 0.282 | 0.250 | 0.974 |
| Zr | 4c | According to Composition Ratio | 0.282 | 0.250 | 0.974 |
| P | 4c | Distributed | 0.095 | 0.250 | 0.419 |
| Si | 4c | According to Composition Ratio | 0.095 | 0.250 | 0.419 |
| O | 4c | 1 | 0.097 | 0.250 | 0.741 |
| O | 4c | 1 | 0.453 | 0.250 | 0.213 |
| O | 8d | 1 | 0.165 | 0.045 | 0.282 |

(Preparation of Cathode)

After the obtained cathodic active material, acetylene black (trade name: "Denka Black"; manufactured by Denki Kagaku Kogyo Kabushiki Kaisha), and PVdF (polyvinylidene fluoride) (trade name: "KF Polymer"; manufactured by Kureha Corporation) were mixed with a mass ratio of 100:10:10, the mixture was mixed with N-methylpyrrolidone (manufactured by Kishida Chemical Co., Ltd.) to form slurry. A cathode was obtained by applying the slurry onto a 20 μm-thick aluminum foil so that the cathode had a thickness of 20 μm to 100 μm. It should be noted that the cathode had an electrode size of 2 cm×2 cm.

(Evaluation of Electrode)

After drying the prepared cathode, a 50 ml electrolyte was put into a 100 ml glass container, and Li metal was used as a counter electrode to perform charging and discharging measurements. The electrolyte (manufactured by Kishida Chemical Co., Ltd.) used was obtained by dissolving $LiPF_6$ in a solvent so that the concentration was 1.4 mol/l, and the solvent used was obtained by mixing ethylene carbonate and diethyl carbonate with a volume ratio of 7:3.

CC-CV (constant current-constant voltage) measurement was performed for charging, and CCV (constant current voltage) measurement was performed for discharging. The CC-CV (constant current-constant voltage) measurement refers to a method of performing the measurement at a constant current until an upper limit voltage and performing the measurement at a constant voltage after the upper limit voltage. The CCV (constant current voltage) measurement refers to a method of performing the measurement at a constant current until a lower limit voltage. The upper limit voltage during charging was 3.9 V, and the lower limit voltage during discharging 2.00 V.

Comparative Example 1

Preparation of Cathodic Active Material $Li_{0.966}(FeZr)_{0.034}(FeZr))_{1.000}P_{0.92}Si_{0.08}O_4$ single-phase powder was synthesized according to the same procedure as that of Example 1, except that the quantity of the lithium source $LiCH_3COO$ was changed to 0.6599 g and the above-described materials were measured out the molar ratio satisfies Li:Fe:Zr:P:Si=1:0.96:0.04:0.92:0.08.

Using the obtained powder, a cathode was prepared using the same method as that of Example 1 to perform the charging and discharging measurements.

Example 2

Preparation of Cathodic Active Material

As starting materials, a lithium source $LiCH_3COO$, an iron source $FeC_2O_4 \cdot 2H_2O$, a zirconium source $ZrO(CH_3COO)_2$, a phosphorus source $(NH_4)_2HPO_4$, and a silicon source $SiO_2$ were used. These starting materials were measured out so that the molar ratio satisfies Li:Fe:Zr:P:Si=0.81:0.96:0.04:0.83:0.08, with the lithium source $LiCH_3COO$ used in an quantity of 0.5345 g. These starting materials were mixed well in an agate mortar. The obtained powder was put into a $SiO_2$ crucible, followed by sintering in a nitrogen atmosphere under conditions of a sintering temperature of 550° C., a sintering time of 12 hours, and a temperature increase/decrease rate of 200° C./h. As a result, an intermediate $Li_{0.81}Fe_{0.96}Zr_{0.04}P_{0.83}Si_{0.08}O_4$ single-phase powder was synthesized.

Next, a lithium source and a phosphorus source which were stoichiometrically deficient were additionally mixed. The addition materials were the same as the starting materials and were measured out and added such that the quantity of the lithium source was 0.19 mol and the quantity of the phosphorus source was 0.14 mol with respect to 1 mol of the intermediate $Li_{0.81}Fe_{0.96}Zr_{0.04}P_{0.83}Si_{0.08}O_4$ single-phase powder. These materials were mixed well in an agate mortar. The obtained mixture was crushed and mixed using a planetary type ball mill. As ball mill conditions, a rotating speed was 400 rpm, a rotating time was 1 hour, a zirconia ball having a diameter of 10 mm was used as a ball, and a zirconia ball pot was used as a mill pot.

15% by weight of sucrose with respect to the obtained powder was added, followed by mixing in an agate mortar and drying. The obtained powder was put into a $SiO_2$ crucible, followed by sintering in a nitrogen atmosphere under conditions of a sintering temperature of 550° C., a sintering time of 12 hours, and a temperature increase/decrease rate of 200° C./h. As a result, $Li_{0.940}(FeZr)_{0.060}(FeZr)_{0.978}P_{0.97}Si_{0.08}O_4$ single-phase powder was synthesized.

Using the obtained powder, a cathode was prepared using the same method as that of Example 1 to perform the charging and discharging measurements.

Comparative Example 2

Preparation of Cathodic Active Material

An intermediate $Li_{0.81}Fe_{0.96}Zr_{0.04}P_{0.83}Si_{0.08}O_4$ single-phase powder was prepared according to the same procedure as that of Example 2. Then, $Li_{0.928}(FeZr)_{0.072}(FeZr)_{1.000}P_{0.92}Si_{0.08}O_4$ single-phase powder was synthesized according to the same procedure as that of Example 1, except that 0.19 mol of the lithium source and 0.09 mol of the phosphorus source were added with respect to 1 mol of the intermediate.

Using the obtained powder, a cathode was prepared using the same method as that of Example 1 to perform the charging and discharging measurements.

Examples 3 to 22

Preparation of Cathodic Active Material

Powders having composition ratios as shown in Table 2 were synthesized according to the same procedure as that of Example 1, except that the quantity of the lithium source LiCH$_3$COO was changed to 0.6599 g and the above-described materials were measured out such that Li:Fe:Zr:P:Si satisfies the molar ratio shown in Table 2.

Using the obtained powders, cathodes were prepared using the same method as that of Example 1 to perform the charging and discharging measurements.

Comparative Examples 3 to 8

Preparation of Cathodic Active Material

Powders having composition ratios as shown in Table 2 were synthesized according to the same procedure as that of Example 1, except that the quantity of the lithium source LiCH$_3$COO was changed to 0.6599 g and the above-described materials were measured out such that Li:Fe:Zr:P:Si satisfies the molar ratio shown in Table 2.

Using the obtained powders, cathodes were prepared using the same method as that of Example 1 to perform the charging and discharging measurements.

(Results)

The compositions of the cathodic active materials of Examples 1 to 22 and Comparative Examples 1 to 8 are shown in Table 2. In Examples 1 to 15 and Comparative Examples 1 to 5, the transition metal sites were Fe, and a part thereof was replaced by Zr, Sn, or Al. In addition, in Examples 16 to 20 and Comparative Examples 6 to 8, the transition metal sites were Mn, and a part thereof was replaced by Zr or Al. In addition, in Examples 20 and 21, the transition metal sites were Fe and Mn, and a part thereof was replaced by Zr. As described above, according to the invention, when b is increased, a can be decreased, and the diffusion rate of Li can be improved. For example, in the cases where the transition metal site was Fe, Examples 1 was compared with Comparative Example 1. The b value of Comparative Example 1 was 0, whereas the b value of Example 1 was 0.03. The a value of Comparative Example 1 was 0.034, whereas the a value of Example 1 was decreased to 0.021. In addition, Examples 2 was compared with Comparative Example 2. The b value of Comparative Example 2 was 0, whereas the b value of Example 2 was 0.02. The a value of Comparative Example 2 was 0.072, whereas the a value of Example 2 was decreased to 0.06. In addition, Examples 6 was compared with Comparative Example 3. The b value of Comparative Example 3 was 0, whereas the b value of Example 6 was 0.05. The a value of Comparative Example 3 was 0.028, whereas the a value of Example 6 was decreased to 0.021. In addition, Examples 11 was compared with Comparative Example 4. The b value of Comparative Example 4 was 0, whereas the b value of Example 11 was 0.09. The a value of Comparative Example 4 was 0.035, whereas the a value of Example 11 was decreased to 0.023. In addition, Examples 13 was compared with Comparative Example 5. The b value of Comparative Example 5 was 0, whereas the b value of Example 13 was 0.04. The a value of Comparative Example 5 was 0.041, whereas the a value of Example 13 was decreased to 0.028. For example, in the cases where the transition metal site was Mn, Examples 16 was compared with Comparative Example 6. The b value of Comparative Example 6 was 0, whereas the b value of Example 16 was 0.03. The a value of Comparative Example 6 was 0.031, whereas the a value of Example 16 was decreased to 0.029. In addition, Examples 17 was compared with Comparative Example 7. The b value of Comparative Example 7 was 0, whereas the b value of Example 17 was 0.03. The a value of Comparative Example 7 was 0.039, whereas the a value of Example 17 was decreased to 0.032. In addition, Examples 18 was compared with Comparative Example 8. The b value of Comparative Example 8 was 0, whereas the b value of Example 18 was 0.04. The a value of Comparative Example 8 was 0.043, whereas the a value of Example 18 was decreased to 0.031.

TABLE 2

| | | Li Site | | | M Site | | | | | | P Site | | | b |
| | | Quantity of Li Site | 1-a (Li) | a (MZ) | y Quantity of M Site | M Fe | Mn | Z Zr | Sn | Al | Quantity of P Site | 1+b-z (P) | z (Si) | (Excess Quantity) |
|---|---|---|---|---|---|---|---|---|---|---|---|---|---|---|
| Comparative Example | 1 | 1 | 0.966 | 0.034 | 1 | 0.96 | — | 0.04 | — | — | 1 | 0.92 | 0.08 | 0 |
| | 2 | 1 | 0.928 | 0.072 | 1 | 0.95 | — | 0.04 | — | — | 1 | 0.92 | 0.08 | 0 |
| | 3 | 1 | 0.972 | 0.028 | 1 | 0.975 | — | 0.025 | — | — | 1 | 0.95 | 0.05 | 0 |
| | 4 | 1 | 0.965 | 0.035 | 1 | 0.95 | — | 0.05 | — | — | 1 | 0.9 | 0.1 | 0 |
| | 5 | 1 | 0.959 | 0.041 | 1 | 0.95 | — | — | — | 0.05 | 1 | 0.95 | 0.05 | 0 |
| | 6 | 1 | 0.969 | 0.031 | 1 | — | 0.975 | 0.025 | — | — | 1 | 0.95 | 0.05 | 0 |
| | 7 | 1 | 0.961 | 0.039 | 1 | — | 0.95 | 0.05 | — | — | 1 | 0.9 | 0.1 | 0 |
| | 8 | 1 | 0.957 | 0.043 | 1 | — | 0.95 | — | — | 0.05 | 1 | 0.95 | 0.05 | 0 |
| Example | 1 | 1 | 0.979 | 0.021 | 0.997 | 0.96 | — | 0.04 | — | — | 1.03 | 1.02 | 0.04 | 0.03 |
| | 2 | 1 | 0.94 | 0.06 | 0.978 | 0.96 | — | 0.04 | — | — | 1.02 | 0.97 | 0.03 | 0.02 |
| | 3 | 1 | 0.982 | 0.018 | 0.998 | 0.9825 | — | 0.0175 | — | — | 1.04 | 0.995 | 0.035 | 0.04 |
| | 4 | 1 | 0.981 | 0.019 | 0.988 | 0.975 | — | 0.025 | — | — | 1.04 | 1.005 | 0.025 | 0.04 |
| | 5 | 1 | 0.981 | 0.019 | 0.979 | 0.975 | — | 0.025 | — | — | 1.05 | 1.005 | 0.035 | 0.05 |
| | 6 | 1 | 0.979 | 0.021 | 0.989 | 0.975 | — | 0.025 | — | — | 1.05 | 0.995 | 0.05 | 0.05 |
| | 7 | 1 | 0.977 | 0.023 | 0.996 | 0.965 | — | 0.035 | — | — | 1.05 | 1.005 | 0.035 | 0.05 |
| | 8 | 1 | 0.976 | 0.024 | 0.994 | 0.965 | — | 0.035 | — | — | 1.06 | 0.995 | 0.05 | 0.06 |
| | 9 | 1 | 0.975 | 0.025 | 0.986 | 0.95 | — | 0.05 | — | — | 1.05 | 0.995 | 0.05 | 0.05 |
| | 10 | 1 | 0.974 | 0.026 | 0.995 | 0.96 | — | — | 0.05 | — | 1.04 | 0.995 | 0.05 | 0.04 |
| | 11 | 1 | 0.977 | 0.023 | 0.994 | 0.95 | — | 0.05 | — | — | 1.09 | 0.97 | 0.1 | 0.09 |
| | 12 | 1 | 0.973 | 0.027 | 0.989 | 0.975 | — | — | — | 0.025 | 1.05 | 1.005 | 0.025 | 0.05 |
| | 13 | 1 | 0.972 | 0.028 | 0.976 | 0.95 | — | — | — | 0.05 | 1.04 | 0.98 | 0.05 | 0.04 |
| | 14 | 1 | 0.964 | 0.036 | 0.989 | 0.875 | — | 0.125 | — | — | 1.05 | 0.79 | 0.25 | 0.05 |

TABLE 2-continued

| Quantity of Li Site | Li Site 1-a (Li) | a (MZ) | Quantity of M Site | M Site y M Fe | Mn | Z Zr | Sn | Al | Quantity of P Site | P Site 1 + b − z (P) | z (Si) | b (Excess Quantity) |
|---|---|---|---|---|---|---|---|---|---|---|---|---|
| 15 | 1 | 0.961 | 0.039 | 0.986 | 0.75 | — | 0.25 | — | — | 1.11 | 0.59 | 0.5 | 0.11 |
| 16 | 1 | 0.971 | 0.029 | 0.995 | — | 0.975 | 0.025 | — | — | 1.03 | 0.97 | 0.05 | 0.03 |
| 17 | 1 | 0.968 | 0.032 | 0.984 | — | 0.95 | 0.05 | — | — | 1.03 | 0.97 | 0.05 | 0.03 |
| 18 | 1 | 0.969 | 0.031 | 0.979 | — | 0.95 | — | — | 0.05 | 1.04 | 0.98 | 0.05 | 0.04 |
| 19 | 1 | 0.96 | 0.04 | 0.975 | — | 0.875 | 0.0125 | — | — | 1.06 | 0.79 | 0.25 | 0.06 |
| 20 | 1 | 0.958 | 0.042 | 0.976 | — | 0.75 | 0.25 | — | — | 1.11 | 0.59 | 0.5 | 0.11 |
| 21 | 1 | 0.977 | 0.023 | 0.992 | 0.4875 | 0.4875 | 0.025 | — | — | 1.05 | 1.005 | 0.025 | 0.05 |
| 22 | 1 | 0.974 | 0.026 | 0.982 | 0.475 | 0.475 | 0.05 | — | — | 1.05 | 0.995 | 0.05 | 0.05 |

The results of the charging and discharging measurements are shown in Table 3. The capacity during charging and discharging at 0.1 C is represented by "Capacity at 0.1 C", the capacity during charging and discharging at 1 C is represented by "Capacity at 1 C", and rate performance is represented by "(Capacity at 1 C/Capacity at 0.1 C). In addition, in the cases where the transition metal site was Fe, when Example 1 was compared with Comparative Example 1, the capacity of Example 1 was increased by twice or more of Comparative Example 1, and rate performance was improved. In addition, since the a values of Example 2 and Comparative 2 were greater than those of Example 1 and Comparative Example 1, the capacity thereof was low, and rate performance was low. However, when Example 2 was compared with Comparative Example 2, the capacity of Example 2 was improved as compared to that of Comparative Example 2, and rate performance was improved. In addition, when Example 6 was compared to Comparative Example 3, the capacity thereof was improved, and rate performance was improved. In addition, when Example 11 was compared to Comparative Example 4, the capacity thereof was improved by twice or more, and rate performance was improved. In addition, when Example 13 was compared to Comparative Example 5, the capacity thereof was improved by twice or more, rate performance was improved. In addition, in the cases where the transition metal site was Mn, when Example 16 was compared to Comparative Example 6, rate performance was improved. In addition, when Example 17 was compared to Comparative Example 7, the capacity thereof was increased by twice or more, and rate performance was improved. In addition, when Example 18 was compared to Comparative Example 8, the capacity thereof was improved, and rate performance was improved.

As described above, by controlling the quantity of P site to be excessive with respect to the stoichiometric proportion of the P site to the transition metal site, it is confirmed that not only rate performance but also the capacity were increased to a large degree.

TABLE 3

| | | Capacity at 0.1 C (mAh/g) | Capacity at 1 C (mAh/g) | Rate Performance (%) |
|---|---|---|---|---|
| Comparative Example | 1 | 61.9 | 44.2 | 71.4% |
| | 2 | 23.2 | 8.7 | 37.5% |
| | 3 | 85.4 | 65.9 | 77.2% |
| | 4 | 55.2 | 38.5 | 69.7% |
| | 5 | 60.4 | 35.8 | 59.3% |
| | 6 | 46.2 | 25.5 | 55.2% |

TABLE 3-continued

| | | Capacity at 0.1 C (mAh/g) | Capacity at 1 C (mAh/g) | Rate Performance (%) |
|---|---|---|---|---|
| | 7 | 21.2 | 6.5 | 30.7% |
| | 8 | 30.6 | 8.5 | 27.8% |
| Example | 1 | 129.2 | 106.9 | 82.7% |
| | 2 | 30.4 | 16.4 | 53.9% |
| | 3 | 125.6 | 110.2 | 87.7% |
| | 4 | 124.9 | 104.2 | 83.4% |
| | 5 | 121.2 | 102.9 | 84.9% |
| | 6 | 120.5 | 99.9 | 82.9% |
| | 7 | 110.3 | 87.5 | 79.3% |
| | 8 | 103.6 | 82.5 | 79.6% |
| | 9 | 101.7 | 75.6 | 74.3% |
| | 10 | 95.6 | 68.5 | 71.7% |
| | 11 | 115.6 | 89.7 | 77.6% |
| | 12 | 129.5 | 91.9 | 71.0% |
| | 13 | 135.6 | 95.2 | 70.2% |
| | 14 | 53.5 | 38.5 | 72.0% |
| | 15 | 48.7 | 33.6 | 69.0% |
| | 16 | 50.6 | 30.9 | 61.1% |
| | 17 | 45.6 | 24.6 | 53.9% |
| | 18 | 47.9 | 26.8 | 55.9% |
| | 19 | 32.9 | 13.2 | 40.1% |
| | 20 | 31.2 | 10.3 | 33.0% |
| | 21 | 118.2 | 92.6 | 78.3% |
| | 22 | 92.4 | 65.2 | 70.6% |

INDUSTRIAL APPLICABILITY

With the cathodic active material according to the invention, a high-power battery which is superior in safety and cost can be provided. Therefore, the cathodic active material according to the invention can be desirably used as a cathodic active material for a nonaqueous electrolyte secondary battery such as a lithium ion battery.

The invention claimed is:
1. A cathodic active material for a nonaqueous electrolyte secondary battery represented by the following formula (1),

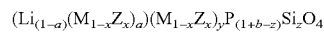
(1)

the cathodic active material comprising:
a lithium-containing transition metal phosphate whose transition metal site and P site are replaced,
wherein the quantity of P site is excessive with respect to the stoichiometric proportion of the P site to the transition metal site;
wherein M is at least one transition metal element;
wherein Z is at least one metal element selected from trivalent and tetravalent metal elements; and wherein $0<x\leq0.33$; $0.9\leq y\leq1.0$; $0<z\leq0.66$; $0<a\leq0.1$; and $0<b\leq0.2$.

2. The cathodic active material for a nonaqueous electrolyte secondary battery according to claim 1,
wherein the M is at least one transition metal element selected from Fe and Mn.

3. The cathodic active material for a nonaqueous electrolyte secondary battery according to claim 2,
wherein the Z is at least one metal element selected from Zr, Sn, Y, and Al.

4. The cathodic active material for a nonaqueous electrolyte secondary battery according to claim 3,
wherein the Z is Zr,
$0.01\leq x\leq0.05$ and $0.02\leq z\leq0.1$.

5. The cathodic active material for a nonaqueous electrolyte secondary battery according to claim 4, wherein $0<a\leq0.025$.

6. A cathode for a nonaqueous electrolyte secondary battery comprising:
the cathodic active material according to claim 1;
a conductive material; and
a binder.

7. A nonaqueous electrolyte secondary battery comprising:
a cathode that includes the cathodic active material according to claim 1, a conductive material, and a binder;
an anode;
an electrolyte; and
a separator.

* * * * *